United States Patent Office 3,542,657
Patented Nov. 24, 1970

3,542,657
ELECTROLYTIC REDUCTION OF NITRATE FROM SOLUTIONS OF ALKALI METAL HYDROXIDES
Albert B. Mindler, Princeton, and Sidney B. Tuwiner, Baldwin, N.J., assignors to Hydronics Corporation, Metuchen, N.J.
No Drawing. Filed Apr. 16, 1968, Ser. No. 721,588
Int. Cl. C01b *13/04;* C01d *1/06*
U.S. Cl. 204—98                                    6 Claims

ABSTRACT OF THE DISCLOSURE

Alkali metal hydroxide solutions are treated in electrolytic cells in accordance with this invention. In this treatment nitrates are converted into nitrites, and nitrites are converted to hydroxides. Oxygen gas is generated at the anodes while at the cathodes nitrate is converted to nitrite and nitrite is converted to ammonia and nitrogen gas in addition to alkali hydroxide.

Under less favorable conditions ammonia and nitrite are, in part, reoxidized by means of an anode reaction which supersedes the oxygen gas-forming reaction, thus reducing the ampere efficiency. Ammonia may also be oxidized at the anode to nitrogen gas.

---

Ampere efficiency is improved by reducing the rate at which cathodic products (other than nitrogen gas) reach the anode. This may be by means of a diaphragm, or by increasing the spacing between the anodes and cathodes. However this results in increasing the cell voltage and the capital cost of equipment.

Certain combinations of current density and cell spacing yield an optimum system for any given concentration of nitrate or nitrite. As the concentration is diminished the current density must be diminished proportionately for optimum performance.

An example is given in which a solution of caustic soda containing sodium carbonate and sodium nitrate is reduced electrolytically in stages with a lowered current density in the later stages. Nickel or nickel plated steel are preferred for anode and cathode construction.

In the production of nickel-cadmium batteries plates are formed by impregnation of a matrix using a solution of nickel nitrate, in the case of the nickel plate and a solution of cadmium nitrate in the case of the cadmium plate. These plates are treated with an aqueous solution of sodium hydroxide or potassium hydroxide solution and they are then subjected to electrochemical conversion of the nickel hydroxide and cadmium hydroxide to the active plate components. This treatment results in the depletion of the sodium hydroxide and accumulation of sodium nitrate in the aqueous solution.

Retention of nitrates in the active plate materials is detrimental to the process of forming the plates and to their use in batteries. Consequently it is necessary to remove nitrate-containing solutions of sodium or potassium hydroxide during the process and to replace them with nitrate-free alkali hydroxide solutions. This results in a requirement of a considerable amount of caustic alkali, and also a necessity of disposal or neutralization of considerable nitrate containing waste solution.

Other industrial chemical operations similarly result in waste solutions containing alkali nitrates and hydroxide. For example, in the precipitation of hydroxides of metals for use as catalysts, or in the regeneration of anion-exchange resins by converting them from the nitrate, to the hydroxide form similar waste solutions are obtained which contain varying proportions of the alkali hydroxides and nitrate. Carbonates may be present also in these solutions as a result of absorption of carbon dioxide from the atmosphere.

The separation of alkali hydroxide from the nitrates has not been accomplished by any method which is economically feasible. It is an object of this invention to achieve a recovery of relatively pure alkali metal hydroxide by electrochemical reduction of the nitrate as follows:

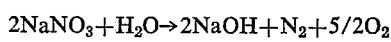

Carbonate, if present in the solution, may be converted to the alkali hydroxide by the so-called causticizing reaction using lime as is well known in the prior art, viz.,

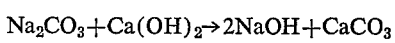

Calcium carbonate, formed in this reaction, is virtually insoluble and may be removed by clarification and by filtration. Thus utilizing the method of this invention, alone or in combination with the causticizing reaction of the prior art, any solution containing alkali metal nitrates and carbonates may be converted to virtually pure solutions of the hydroxide.

The electrochemical reduction of the alkali metal nitrate in accordance with the method of this invention proceeds in stages, the first of which consists of a reduction of nitrate to nitrite, viz.,

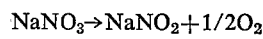

followed by subsequent reduction of the nitrite, viz,

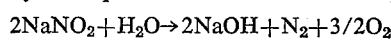

It will be seen therefore that the method of this invention is applicable to the removal of nitrite, as well as nitrate, from solutions.

We have discovered that when an electric potential is applied between two electrodes in a solution of alkali hydroxide containing nitrate, oxygen is produced at the anode, in accordance with the reaction:

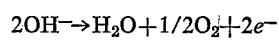

with a corresponding cathode reaction

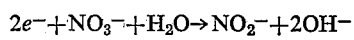

In the period during which there is sufficient nitrate in the solution to sustain the cathode reaction there is no gas formation at the cathode or within the solution except at the anode from which bubbles of oxygen arise.

We have found, however, that as the nitrate is depleted fine bubbles of nitrogen arise out of the solution in the vicinity of the cathode. This is a result of a secondary cathode reaction:

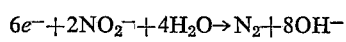

with a corresponding reaction at the anode:

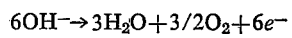

The gases evolved from the cell develop an odor of ammonia indicating still another cathode reaction:

When we compare the quantity of electricity in faradays which is required, with the number of chemical equivalents of nitrate which is reduced we find that there is considerable variation of ampere efficiency depending on the electrode materials, electrode configuration and spacing, current density, composition of the solution and the intensity of agitation.

The loss of efficiency is because of products which are reoxidized at the anode, viz, $$2NH_3 + 6OH^- \rightarrow N_2 + 6H_2O + 6e^-$$
$$NH_3 + 7OH^- \rightarrow NO_2^- + 5H_2O + 6e^-$$
$$NO_2^- + 2OH^- \rightarrow NO_3^- + H_2O + 6e^-$$

This loss of efficiency is aggravated by those conditions which contribute to an increased rate of transfer of ammonia and nitrite to the anode, viz, agitation and close spacing of electrodes.

We have found that when the electrolytic reduction is carried out in a cell with a diaphragm, the ampere efficiency may be very high. A diaphragm suitable for this use is woven asbestos cloth, cotton duck cloth or nonwoven nylon cloth. Suitable diaphragm materials also include alkali resistant carboxylic cation-exchange membranes such as acrylic-grafted polyethylene.

The provision of diaphragms involves considerable added capital expense for electrolytic cell construction. Means must be provided for supporting said diaphragms and expense is incurred additionally in installing and replacing them. Consequently in the preferred embodiment of this invention the cells for the electrolytic reduction of nitrate and nitrite do not include a separating medium. Omission of the diaphragm may result in somewhat lower ampere efficiency. Nevertheless we have found that by providing an optimum combination of electrode materials, electrode configuration, and spacing in combination with current density the ampere efficiency may be comparable with that achieved with diaphragms.

Other conditions remaining constant, the ampere efficiency of the cell increases as the electrode spacing is increased. This is because reoxidation of ammonia and nitrite at the anode is lessened by the reduced rate of transfer of these substances from the cathodes. Against this advantage the cell voltage is increased by the greater electrolyte resistance as the spacing is increased. The power consumed by the cell is the product of the current and the voltage. With one factor increasing and with the other factor decreasing there is an optimum electrode spacing for which the power requirement per unit of nitrate converted is a minimum. It is an object of this invention to control the electrode spacing so as to minimize this power consumption.

We have found that for a given solution composition and electrode spacing the ampere efficiency is a complex function of the current density. At very low current density the anode has a tendency to reoxidize ammonia and nitrite in preference to producing oxygen. At higher current densities, owing to concentration polarization, a larger proportion of the anodic current is consumed in producing oxygen. On the other hand a higher cathode current density is detrimental to ampere efficiency owing to nitrite reduction to ammonia in preference to its reduction to nitrogen gas. At still higher densities hydrogen is produced at the cathode with additional loss of efficiency. The current density in the cell should be preferably from 5 to 100 amperes per square foot of wetted cathode area.

The cell voltage increases with the current density because of the electrode polarization and solution resistance. For any given combination of electrode composition, configuration and spacing there is an optimum current density which depends on the concentration of nitrate and nitrite. It is an object of this invention to control this current density to minimize the power consumption.

Among the metals which are suitable for use as cathodes in the method of this invention are copper, lead, tin, iron, silver, cadmium, platinum cobalt, nickel and alloys thereof or coatings of these on the other metals. Anodes should be, preferably, of nickel. Copper and silver anodes may be employed but they are characterized by a strong tendency to reoxidize ammonia to nitrite. Cobalt and platinum partake of the same tendency and, in addition, oxidize nitrite anodically to nitrate. Iron is somewhat similar in its anodic behavior to nickel but is badly corroded by anodic attack. While cobalt and iron exhibit some undesirable reactions, these metals and alloys of nickel, cobalt and iron are effective anode surfaces. Ferrous alloys resistant to anodic attack, e.g., stainless steels, may be used as anodes in the practice of this invention.

As is well known in the prior art bipolar electrodes may be arranged in a parallel series in an electrolytic tank in which they are immersed in the electrolyte. The bipolar electrodes set in vertical and parallel array divide the tank into cells which are in series electrically. The end electrodes are connected with the external direct current source while the intermediate bipolar electrodes require no external connection. The opposing faces serve as cathode and anode of each cell.

The series system of electrolytic reduction of alkaline nitrate-, or nitrite-containing, solutions is utilized in a preferred embodiment of this invention. The bipolar electrodes may be suitably of nickel, or of nickel-plated steel in which the nickel plate is at least on the side which serves as the anode in the electrolytic process.

This invention will be described in more detail in connection with the following specific examples which set forth typical conditions of current density, temperature and voltage.

EXAMPLE I

A solution containing 20% NaOH, 5% NaNO$_3$ and 4% Na$_2$CO$_3$ was delivered to one end of a rectangular concrete tank which is lined with ¾ inch Transite asbestos-cement board. The inside dimensions were 21½ inch width x 15 feet length x 3 feet 8 inches height. Bipolar electrodes of 24 gage nickel-plated cold rolled steel, 22 inches wide by 3 feet 6 inches long were mounted across the tank, spaced 2¼ inches apart throughout the length. The side edges of each of the electrode sheets were inserted in ⅜₆ inch vertical slots, in each of the Transite side wall sheets. This method of mounting the bipolar electrodes insured their retention in equispaced parallel relation and reduced any opportunity for leakage of electric current through a solution path around the side or bottom edges of the electrodes. Virtually all of the current which is furnished was passed into, through, and out of, the bipolar electrode sheets.

The tank was divided in this way into 71 cells separated by 70 nickel plated sheets and with two additional electrode sheets at the two opposite ends of the tank. Both of these were connected to the negative side of the D.C. power supply which was at ground potential. The positive side of the power supply, at 135 volts, was connected with the 20th electrode. The negative current enters this electrode, which served as a cathode on both faces, and passed in both directions from cell to cell to the two end electrodes which served as anodes. The intervening electrodes were bipolar.

The current to the 20th electrode was 778 amperes, 556 amperes going along the shorter path to one end of the tank and 222 amperes going to the other end from which the product liquid, containing very little nitrate and nitrite was discharged.

The feed solution entering at the end to which the greater current flow is directed, was at a rate of 1.0 g.p.m. It flowed at this rate from cell to cell through two holes in each bipolar electrode and through the anode at the discharge end of the tank. Each hole opening was provided with a 4 inch long section of Tygon tubing with a ½ inch bore. This section was inserted in a 1 inch diameter hole in the electrode sheet. The center of the hole openings were 3 inches from the top and 2 inches from the side for the one hole and 2 inches from the bottom and 2 inches from the other side for the other hole in each electrode. The hole locations were staggered, alternating side to side so that the solution path was zig zag along the length of the tank.

To provide the head for the solution flow through the electrode hole openings the tank was inclined so that the feed end was 8 inches above the discharge end.

A discharge opening was provided through the end wall to maintain a solution at a level to provide 42 inches of electrode immersion. The bipolar electrodes were set to project one inch above the normal level of the solution. The two end cathode sheets were longer to provide for a ¼ x 1 inch nickel plated copper bar on each face along the top edge of each cathode. The bars were held to the sheet by stainless steel bolts placed at intervals along the upper edge of the sheet. These bolts extended through the holes at the flat side of the bars and through the sheets. This provided a means for electrical contact with an external cable to the power supply. The cathode which constitutes the 20th electrode was similar in construction to the second end electrode. The tank was provided with a suitable cover which opened into a duct near the liquid feed end of the tank and there was a 3 inch wide slot extending across the width of the cover at the discharge end. The slot was for influx of air. The duct was connected with a suction fan to provide at least 250 c.f.m. of discharge capacity for air and electrolysis gases.

The solution entered the electrolysis tank at atmospheric temperature and exited at 160° F. Evaporation of the solution occurred to the extent of 1.7 lbs. of water per minute. Hot solution which exited the electrolysis tank went to a recausticizing system to convert the carbonate to additional caustic soda.

EXAMPLE 2

One liter of a solution containing 20% NaOH, 4% $Na_2CO_3$ and 4.82% $NaNO_3$ was placed in a rectangular cell of acrylic plastic, inside dimensions of 6 x 15 cm. and 15 cm. deep. Electrodes were of nickel sheet, 14 x 11 c., ane anode and one cathode, 6 cm. between faces. A current of 10 amperes was applied for 143 minutes. The cell voltage was 4.0–4.1 volt and the temperature rose from 34 to 43.5° c. during the period of reduction.

The nitrate content of the solution product indicated a drop of 23.7% from that of the initial solution before electrolysis. Based on a theoretical requirement of 8 faradays for each gram mole of sodium nitrate for reduction to ammonia, the current efficiency for this run in 156.5%. Based on a theoretical requirement of 5 faradays per mole to nitrogen gas, the efficiency is 97.75%. The current density was 59.5 amperes per square foot (a.s.f.).

When the electrolysis was repeated at the same current density for 425 minutes the removal of nitrate was 58.5% and the ampere efficiency was 131.3% based on reduction to ammonia or 82.1% based on reduction to nitrogen. The temperature was 26–35.5° C. and the cell voltage 3.9–4.2 volts. Further extension of electrolysis to 24.08 hours led to a reduction of nitrate by 92% at an ampere efficiency of 62.8% based on reduction to ammonia, or 39.25% based on nitrogen, for the latter period of electrolysis. The temperature was 39–37° C. and the cell operated at 4.2 volts.

When the current density was increased to 85 a.s.f. in a repetition of the treatment for 6.62 hours the reduction of nitrate was 67% and the ampere efficiency was 114.4% based on reduction to ammonia, or 71.5% based on reduction to nitrogen. The temperature was 45–58.5° C. and the cell voltage 4.2–4.8 volts. Subsequently the current density was dropped to 14.75 a.s.f. for an additional period of 17.21 hours after which the nitrate was reduced 100% to nearly zero concentration with an ampere efficiency of 121.3% based on reduction to ammonia, or 75.8% based on reduction to nitrogen. The temperature was 44° C. and the cell voltage 3.5 volts.

When the electrolysis of the same solution and in the same cell was repeated for 23–87 hours at 29.8 a.s.f., 89.4% of the nitrate was removed with a current efficiency of 118.5% based on the theoretical current to produce ammonia, or 79% based on reduction to nitrogen. The temperature was 36.5–37.8° C. and the cell voltage was 3.2 volts.

The power which is required for reduction is a function both of the ampere efficiency and the cell voltage. At the current density of 29.8 a.s.f. and with 89.4% of the nitrate removed the power required was 3.11 kwh./lb. of nitrate removed. At the higher current density of 59.5 a.s.f. with the same electrode spacing the power requirement was 2.96 kwh./lb. with 23.7% of the nitrate removed. However with greater percentage removal at this current density the power requirement is increased owing to the reduced ampere efficiency. This in indicated in the following table:

TABLE I

[Efficiency of reduction of nitrate from solution containing 20% NaOH, 4% $Na_2CO_3$ and 4.82% $NaNO_3$ with 6 cm. electrode spacing at 59.5 a.s.f. using nickel anode and cathode]

| Percent nitrate reduction: | Ampere efficiency based on $NO_3^-$ to $NH_3$ | kwh./lb. $NaNO_3$ reduced |
|---|---|---|
| 23.7 | 156.5 | 2.96 |
| 58.5 | 131.3 | 3.63 |
| 67 | 114.4 | 4.5 |
| 92 | 62.8 | 6.95 |

This indicates the desirability of operating at high current density and with wide spacing in the initial stages of reduction. On the other hand with the lower current density of 29.8 a.s.f. reduction at good efficiency extends to a much lower nitrate concentration.

EXAMPLE 3

A liter of the same solution which was treated by electrolysis in Example 2 was treated in the same cell except that the nickel anode was replaced with an anode of Type 304 stainless steel of the same size. The current density was 21.3 a.s.f.; the cell voltage, 4.1 volts; the temperature was 26–32° C. The removal of nitrate was 91.8% and the current efficiency was 84.3% based on the theoretical for reduction to ammonia, or 52.75% based on the theoretical for reduction to nitrogen. Power consumed in the cell was 5.12 kwh./lb. $NaNO_3$ reduced. When the electrolysis was repeated using carbon steel electrodes 93.75% of the nitrate was reduced at an ampere efficiency of 96% based on reduction to ammonia, or 62.5% based on nitrogen. The steel anodes showed signs of having been corroded. There was a gelatinous brown precipitate which was identified as ferric hydroxide.

EXAMPLE 4

In the same rectangular plastic container used in Example 2 two intermediate sheet electrodes were interposed between the two end electrodes. These intermediate electrodes extended the full width of the space between the side walls and they were equally spaced in a vertical position. The voltage was applied to the two end electrodes, the intermediate electrodes being bipolar. The vessel was thus divided into three cell compartments with electrodes spaced 2 cm. apart. All electrodes were of nickel.

With a current of 10 amperes, equivalent to 59.5 a.s.f. the volume of solution in each of the three cells was ⅓ liter. The average cell voltage was 2.4 volts over a period of electrolysis of 314 minutes during which the temperatures varied from 43–76° C. Ampere efficiency for 61.2% nitrate removal was 50% based on the theoretical for reduction to ammonia, or 31.3% based on the theoretical for reduction to nitrogen.

When this electrolysis was repeated over a period of 285 minutes at the same current density the reduction of nitrate was 52.0%. The average cell voltage was again 2.4 volts; the temperature, 56–59° C., the ampere efficiency, 55% based on the theoretical for reduction to ammonia and 34.35% based on reduction to nitrogen.

When this electrolysis was again repeated over a period of 364 minutes at the same current density the reduction of nitrate was 80.5%. The average cell voltage was again 2.4 volts; the temperature 50–59° C., the ampere efficiency 70.2%, based on the theoretical for reduction to ammonia, or 43.8% based on reduction to nitrogen. The effect of varying the treatment time and percent removal of nitrate on the efficiency is shown in.

TABLE 2

Efficiency of reduction of nitrate from solution containing 20% NaOH, 4% Na₂CO₃ and 4.82% NaNO₃ with 2 cm. electrode spacing at 59.5 a.s.f. using nickel anode and cathode]

|  | Ampere efficiency based on NO⁻₃ to NH₃ | kwh./lb. NaNO₃ reduced |
|---|---|---|
| Percent reduction: |  |  |
| 47.7 | 70.5 | 3.91 |
| 61.2 | 50 | 4.10 |
| 80.5 | 70.2 | 3.93 |

EXAMPLE 5

In the same rectangular container used in the previous Examples 2, 3 and 4 with the two end nickel electrodes were used as anodes and a third anode, 14 x 10 cm. was placed vertically midway between the two. Two nickel cathodes, 14 x 10 cm. immersed, were placed, each midway between the anodes. The total immersed anode area was 590 square cm. and the total cathode area was 560 square cm. The anode to cathode spacing was 1.5 cm.

With a current density of 23 a.s.f. one liter of the same solution used in the preceeding examples was electrolyzed for 5.75 hours at a temperature of 38–46.5° C. The cell voltage was 3.3 volts and the temperature was 38–46.5° C. The nitrate content was reduced by 42.5% with an ampere efficiency of 72% based on the theoretical for reduction to ammonia, or 45% based on reduction to nitrogen.

The remaining 57.5% of the nitrate was reduced in an additional electrolysis of 17.5 hours at an average cathode current density of 7 a.s.f. and a temperature of 28.5° C. The ampere efficiency was 106.5% based on the theoretical for reduction to ammonia, or 66% based on reduction to nitrogen.

The electrolysis was repeated using 1 liter of the original solution at 16.5 a.s.f. for 6 hours. With 29.7% of the nitrate reduced at 35–38° C., the ampere efficiency was 60%. With further electrolysis for an additional 17.4 hours at 33–38° C. there was reduction of an additional 62.5% of the nitrate to 92.2% with an ampere efficiency for the latter portion of the reduction of 98.5% based on theoretical reduction to nitrogen.

The electrolysis was again repeated, using 1 liter of the original solution, at a current density of 8.3 a.s.f. for 47 hours. The temperature was 25–32° C. and 85.7% of the nitrate was reduced at an ampere efficiency of 86.8% based on the theoretical reduction to ammonia and 54.3% based on reduction to nitrogen. The average cell voltage was 2.7 volts.

In still another repetition of the electrolysis of one liter of the original solution a cathode current density of 46.3 a.s.f. was applied for 6 hours. This resulted in a reduction of 54.2% of the nitrate at an ampere efficiency of 88.5% based on theoretical reduction to ammonia, or 55.3% based on reduction to nitrate. The temperature was 37–45° C. and the average cell voltage was 3.3 volts.

In still another repetition of the electrolysis of one liter of solution at a cathode density of 8.3 a.s.f. for 26.47 hours the ampere efficiency was 94% based on theoretical reduction to ammonia and 58.75% based on reduction to nitrogen. The temperature was 23–29° C. and the average voltage was 2.9 volts. For the 8.3 a.s.f. current density the comparison of reduction efficiency for varying degree of reduction of nitrate is shown in the following table:

TABLE 3

[Efficiency of reduction of nitrate from solution containing 20% NaOH, 4% Na₂CO₃ and 4.82% NaNO₃ with 1.5 cm. spacing at 8.3 a.s.f. cathode current density using nickel anodes and cathodes]

|  | Ampere efficiency based on NO⁻₃ to NH₃ | kwh./lb. NaNO₃ reduced |
|---|---|---|
| Percent reduction: |  |  |
| 85.7 | 86.8 | 3.58 |
| 89.1 | 94.0 | 3.53 |
| 92.2 | 98.5 | 3.12 |
| 100 | ¹106.5 | 3.14 |

¹ For 7 a.s.f. density.

EXAMPLE 6

Employing the same apparatus as in Example 5 but with a single cathode of a sintered nickel cadmium-filled battery plate and two facing anodes of sheet nickel, one liter of starting solution was treated by electrolysis at 46.5 a.s.f. for 6.59 hours with a resultant reduction of 62.1% of the nitrate at an ampere efficiency of 66.4% based on the theoretical for reduction to ammonia or 41.5% based on reduction to nitrogen. The anode and cathode area were both 280 square cm. with 1.5 cm. spacing. The temperature was 43–48° C. and the voltage was 3.8 volts.

Repeating the electrolytic reduction under the same conditions with another one liter of starting solution, but with the sintered plaque cadmium plate as the anode and the nickel sheet as the cathode, 52.8% of the nitrate was reduced in 6.83 hours with an ampere efficiency of 59% based on the theoretical for reduction to ammonia or 36.9% based on reduction to nitrogen. The temperature was 35–39° C. and the voltage was 4.3 volts.

EXAMPLE 7

Repeating the electrolytic reduction of one liter of solution as in Example 5, but with carbon steel sheet anodes and cathodes in place of the nickel and at a current density of 23 a.s.f. for 4.92 hours, 37.9% of the nitrate was reduced at an ampere efficiency of 76% based on the theoretical requirement for reduction to ammonia, or 47.5% based on reduction to nitrogen. The temperature was 40–41° C. and the cell voltage was 3.2 volts.

Again repeating the electrolytic reduction at the same current density for 6.25 hours there was a reduction of 43% in the nitrate at a current efficiency of 75.3% based on the theoretical for reduction to ammonia, or 47.1% based on the reduction to nitrogen. The temperature was 39–41° C. and the voltage was 3.2 volts. In all of the reductions using carbon steel anodes there was a voluminous brown corrosion product and a purple color of permanganate or perferrate developed in the electrolyte.

In all of the foregoing examples a strong odor of ammonia permeated the atmosphere over the electrolyte during the reduction.

We claim:

1. A method of converting an alkali metal nitrate or nitrite salt to the alkali metal hydroxide in alkali metal hydroxide solution in an electrolytic cell in which a direct current is imposed between anodes and cathodes in said cell, thereby producing oxygen gas at said anodes and the alkali metal hydroxide at said cathodes.

2. A method according to claim 1 in which the wetted surface of the anodes is composed of a metal of the group comprising nickel, cobalt and iron; or of an alloy of said metal.

3. A method according to claim 1 in which the wetted surface of the cathodes is composed of a metal of the group comprising nickel, cobalt, iron, cadmium or copper; or an alloy of said metal.

4. A method according to claim 1 in which the current density is between 5 and 100 amperes per square foot of wetted cathode area.

5. A method according to claim 2 in which the anodes and cathodes consist of the opposing faces of bipolar electrode sheet metal, said electrodes in vertical and parallel array defining solution-containing electrolyte cells, the imposed direct current flowing through said cells in series.

6. A method according to claim 5 in which the alkaline aqueous solution is caused to flow through narrow passages of communication from cell to cell in series.

References Cited
UNITED STATES PATENTS

| 1,096,085 | 5/1914 | White | 204—98 |
| 1,250,183 | 12/1917 | Jenkins | 204—98 |
| 3,124,520 | 3/1964 | Juda | 204—98 X |

DANIEL E. WYMAN, Primary Examiner

W. J. SHINE, Assistant Examiner

U.S. Cl. X.R.

204—129, 153